United States Patent [19]

Hansen

[11] Patent Number: 4,480,710
[45] Date of Patent: Nov. 6, 1984

[54] COMBINATION SWINGOUT BATTERY TRAY AND STEP

[75] Inventor: Kenneth N. Hansen, Waukesha, Wis.

[73] Assignee: Allis-Chalmers Corp., Milwaukee, Wis.

[21] Appl. No.: 430,013

[22] Filed: Sep. 30, 1982

[51] Int. Cl.³ .............................................. B60R 18/02
[52] U.S. Cl. ..................................... 180/68.5; 182/84; 182/127; 280/164 R
[58] Field of Search ................. 248/289.1; 182/77, 84, 182/127, 129; 180/68.5; 280/163, 164 R, 166; 296/62

[56] References Cited

U.S. PATENT DOCUMENTS

| 1,797,873 | 3/1931 | McManus | 280/164 R X |
| 3,224,525 | 12/1965 | Froitzheim et al. | 280/166 X |
| 3,821,997 | 7/1974 | Sieren | 180/68.5 |
| 3,930,552 | 1/1976 | Kunkle et al. | 180/68.5 |
| 4,074,786 | 2/1978 | Joubert | 280/164 R X |
| 4,125,284 | 11/1978 | Hicks et al. | 280/164 R X |
| 4,174,116 | 11/1979 | Slosiarek et al. | 280/163 |
| 4,249,683 | 2/1981 | Park | 182/129 X |

Primary Examiner—Joseph F. Peters, Jr.
Assistant Examiner—Michael Mar
Attorney, Agent, or Firm—Arthur L. Nelson

[57] ABSTRACT

A swingout battery tray and step pivotally mounted on a vehicle chassis with a latch to secure the battery tray in its operating position and a releasable fastener to secure the step in its normal operating position.

8 Claims, 3 Drawing Figures

COMBINATION SWINGOUT BATTERY TRAY AND STEP

This invention relates to a vehicle step and battery mount and more particularly to a pivotally mounted step and battery mount pivotally supported and latched on the vehicle chassis.

The number of accessories and attachments mounted on the tractor often require mounting in the same general area and adjacent other accessories. Since the accessories may require servicing and replacement, they must be arranged to facilitate these needs. A convenience in replacing or servicing will generally promote better servicing. The Sieren patent, U.S. Pat. No. 3,821,997, shows a pivotal battery mount with a tray carrying batteries pivotally swingable to a position for convenient servicing. The batteries will also freely swing from the servicing position to the operating position. The applicant's invention has provided for a swingout battery mount, however, a step has been mounted which would normally limit access to servicing of the battery, since the battery and the step are mounted on the same side of the tractor. Accordingly, a means of moving the steps to allow servicing of the battery is needed. The swingout battery mount is reinforced to carry the steps in the swingout position. In the operating position, an additional connection to the vehicle chassis is provided. A strut carried on the battery tray extends outwardly to engage a mating strut on the step to allow the step to swing as a unit with the battery tray. Additional fastening means locks the step in its operating position while the latch locks the battery tray in its normal operating position.

It is an object of this invention to provide a pivotal battery mount and step with a latch and locking means.

It is another object of this invention to provide a step mounted on a pivotally mounted battery tray with a latch for latching the battery tray in its normal operating position and locking means for locking the step in its normal operating position.

It is a further object of this invention to pivotally mount a step and battery tray to pivot on a common axis with the latch means holding the battery tray and a fastening means holding the step in their operating position.

The object of this invention is accomplished by pivotally mounting a battery tray on a vehicle chassis and providing a tray rest for carrying the battery tray in its normal operating position. A latch is provided to latch the battery tray in its operating position. A step is mounted on the vehicle chassis through fastening means and extends outward of the battery tray. A strut on the battery tray is fastened to a mating strut on the step to allow the step and battery tray to pivot on a common axis when the tray is pivoted to a servicing position. In the operating position, the step is partially carried by the strut on the battery tray and also carried on a bracket fixed to the vehicle chassis. Slotted openings in the bracket allow the step to pivot from its operating position when the bolts holding the bracket to the chassis are loosened. In this manner the step and battery tray are pivoted as a unit to allow servicing or replacement of the batteries on the tray without any obstruction from the steps.

Referring to the drawings, a preferred embodiment of this invention is illustrated.

Figure 1:
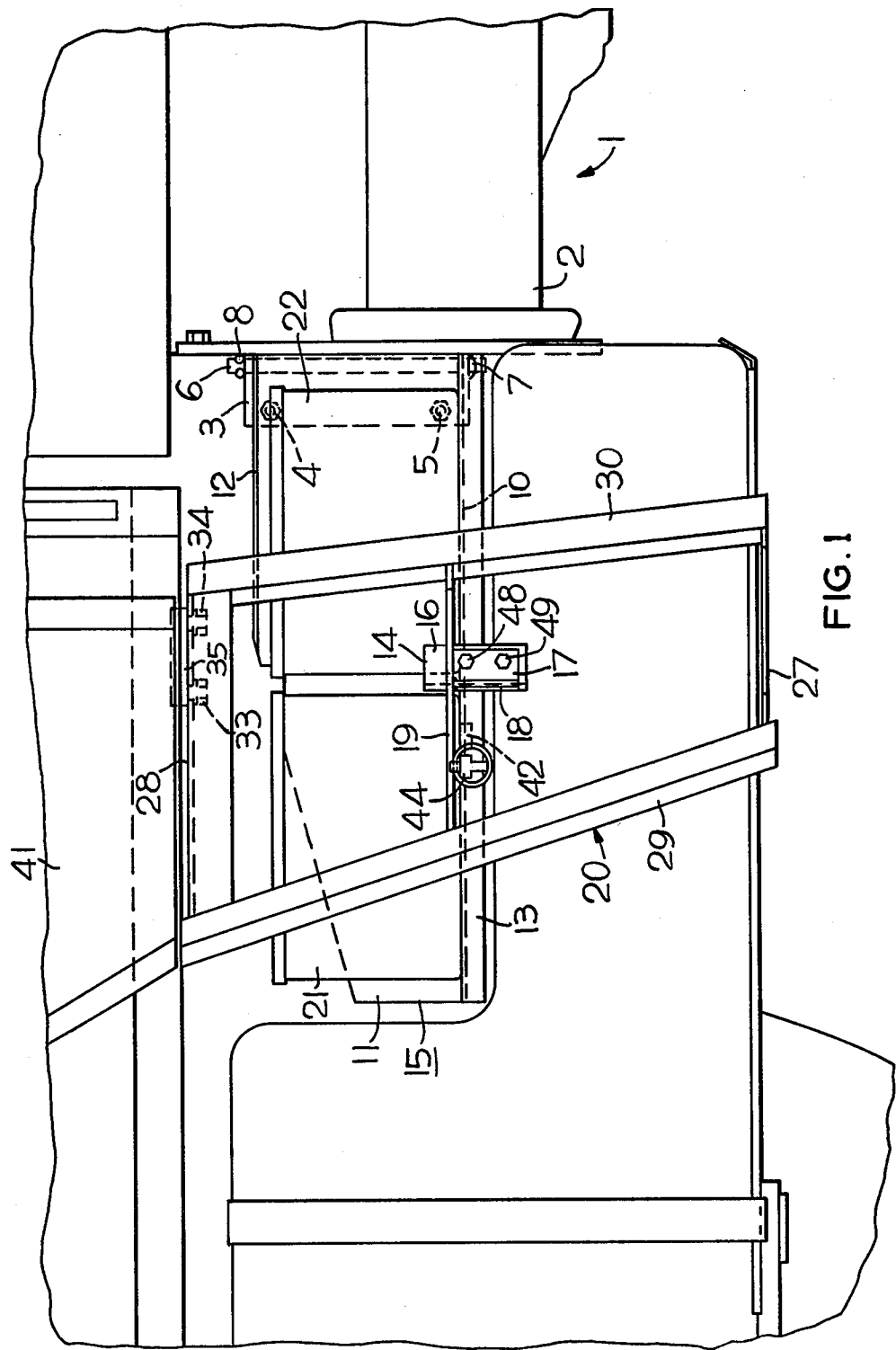
FIG. 1 illustrates a side elevation view of the step and battery tray mounted on the vehicle.

Referring to the drawings, the vehicle 1 includes a vehicle chassis 2. A U-shaped battery support bracket 3 is fastened to the chassis by bolts 4 and 5. The bracket 3 carries the pivot pin 6 which is fitted with a retainer washer 7 on its underside and swagged wings 8 on its upper end to maintain the pin in its pivotal position for carrying the tray 15. The tray 15 is reinforced by forming a horizontal battery rest section 10 and the vertical section 11. The vertical portion 11 is also formed with top right angle section 12 which receives a pin on the front end and the right angle portion 13 on the lower support portion 10. The right angle portions 12 and 13 provide stiffness for the tray in support of the batteries. The strut 14 is fabricated to the base 10 of the tray 15. A strut 14 is formed with a flange 16 which is fastened to a mating flange 17 on the step strut 18 by bolts 48 and 49. The strut 18 is welded to the intermediate foot pad 19 of the step 20 and flange 117 is fastened to flange 16. The batteries 21 and 22 are carried on the horizontal battery rest portion 10 and the battery clamps including a clamp 23 and bolts 24, 25 and 26. The diagonal bolts 24, 25, 26 are fastened to the corner 27 between the vertical portion 11 and horizontal battery rest portion 10 under the battery tray.

The step 20 is formed with a lower foot rest 27 intermediate foot rest 19 and the upper cross member 28. The foot rests and cross member are fabricated to the beams 29 and 30. The upper cross member 28 is fitted with slots 31 and 32 which receive the bolts 33 and 34 in the operating position. The bolts 33, 34 threadedly engages complementary threaded openings in a step supporting bracket in the form of a beam 35. These bolts are loosened when the step is pivoted away from the vehicle in the battery servicing position.

Step 20 is fastened to the vehicle chassis which includes the beam 35 extending transversely of the vehicle. A platform 36 is resiliently mounted on the chassis with the resilient rubber isolator 37 which is carried on the welded component 38 of beam 35. The isolator includes a bolt 39 which extends through the rubber isolator 37 and is fastened through a washer 40. The vehicle cab 41 is integral with the platform 36. The step provides access to the cab when in the operating position.

The battery tray 15 is carried on the pivot pin 6 in a servicing position. in the operating position, the battery tray is carried on the pin 6 and the battery rest 42 which is carried on the bracket 43 supported on the vehicle chassis. A latch 44 carried on the battery rest 42 latches the battery tray 15 in its operating position. Accordingly, support for the step in its normal operating position is provided through the struts between the tray and step for carrying the load of the step in its operating position.

Figure 2:
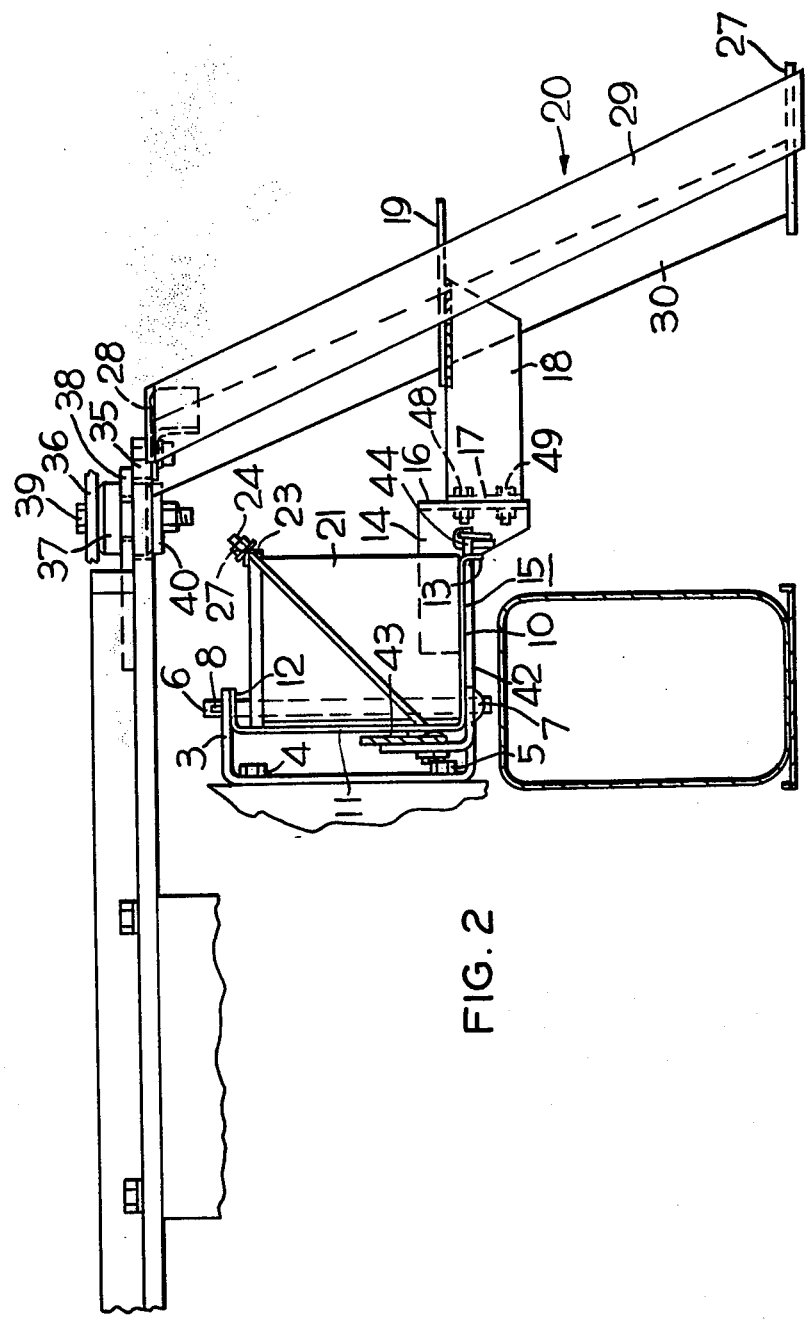
FIG. 2 is an end view of the step and battery tray mounted on the vehicle chassis.
Figure 3:
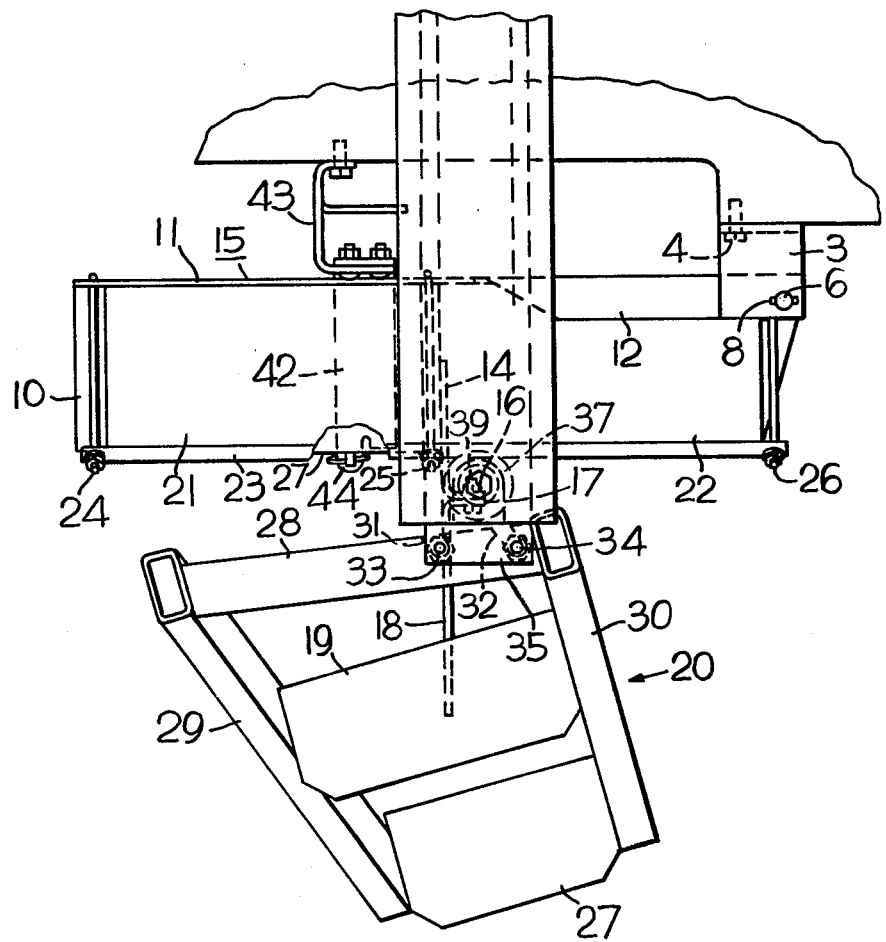
FIG. 3 is a plan view of the step and battery tray mounted on the vehicle chassis.

In the operating position, battery tray 15 is pivoted to the position as shown in FIGS. 1, 2, and 3 and the latch 44 is in the latched position. The step 20 is also in the position shown in FIGS. 1, 2, and 3 and the bolts 33 and 34 are tightened to hold the foot rest 28 firmly with the beam 35. Since the struts 14 and 18 are fastened together, the step 20 and the battery tray 15 operate as an integral structure.

When it is desired to service the batteries 21 and 22, the latch 44 is released. The bolts 33 and 34 are loosened. The battery tray 15 and step 20 are then permitted to swing outwardly from the vehicle chassis allowing for servicing or replacement of the batteries. When it is desired to reposition the battery tray and step in their operating position, the tray and step are swung inwardly toward the vehicle chassis until the battery tray 15 is supported on the tray rest 42. In this position, the latch 44 is then latched to hold the tray in its operating position. The bolts 33 and 34 are then in the slot 31 and 32. Bolts 33 and 34 are then tightened to lock the step in its operating position and to provide additional support in addition to the support of the struts 14 and 18.

The embodiments of the invention in which an exclusive property or privilege is claimed are defined as follows:

1. A pivotal step and battery tray mount for a vehicle comprising, a vehicle chassis, a battery tray, pivot means pivotally supporting said battery tray on said vehicle chassis for pivotal movement on a vertical axis between an operating position alongside said vehicle chassis to a laterally outwardly disposed servicing position, a latch operatively associated with said vehicle chassis and battery tray manually operable to releasably lock said battery tray to said vehicle chassis in the operating position of said battery tray and to release said battery tray from said chassis to permit swinging movement of said battery tray to its servicing position, a step, a step support rigidly secured to said battery tray and to said step for supporting the latter, a step mounting bracket on said vehicle chassis and releasable fastening means releasably securing an upper part of said step to said step mounting bracket in its operating position, release of said fastening means permitting pivoting of said battery tray and step to said servicing position of said battery tray.

2. A pivotal step and battery tray mount secured to said chassis and supporting a vehicle as set forth in claim 1 including a tray rest for said battery tray, a latch on said tray rest for latching said battery in its operating position.

3. A pivotal step and battery tray mount for a vehicle as set forth in claim 1 including a tray rest supporting said battery tray in its operating position.

4. A pivotal step and battery tray mount as set forth in claim 1 wherein said pivot means includes a vertical pivot pin pivotally interconnecting said battery tray and vehicle chassis.

5. A pivotal step and battery tray mount for a vehicle as set forth in claim 1 wherein said step includes a plurality of foot rests, a strut connected between said battery tray and said step.

6. A pivotal step and battery tray mount for a vehicle as set forth in claim 1 wherein said pivot means is at one end of said battery tray and a strut rigidly secures a middle portion of said battery tray to said step for partially supporting said step in its operating position.

7. A pivotal step and battery tray mount as set forth in claim 6 wherein said strut includes a pair of brackets integral with said battery tray and step, respectively, and releasable fasteners rigidly securing said brackets to one another.

8. A pivotal step and battery tray mount for a vehicle comprising, a vehicle chassis, a battery tray pivotally mounted on said vehicle chassis, a step, a step support on said battery tray supporting said step, a step mounting bracket on said vehicle chassis releasably locking said step on said chassis in its operating position and releasing said step to permit pivoting of said battery tray for servicing of the batteries on said battery tray, slots formed in an upper part of said step and, bolts in said step mounting bracket received in said slots for fastening said step in the operating position and sliding in said slots when said step is pivoted with said battery tray to the battery tray servicing position.

* * * * *

UNITED STATES PATENT OFFICE
CERTIFICATE OF CORRECTION

Patent No. 4,480,710          Dated November 6, 1984

Inventor(s) Kenneth N. Hansen

It is certified that error appears in the above-identified patent and that said Letters Patent are hereby corrected as shown below:

Column 3, line 38, cancel "secured to" and substitute

--- for ---;

line 39, cancel "said chassis and supporting";

Column 4, line 1, cancel "for" and substitute --- secured to said chassis and supporting ---.

Signed and Sealed this

Second Day of April 1985

[SEAL]

Attest:

DONALD J. QUIGG

Attesting Officer      Acting Commissioner of Patents and Trademarks